(12) United States Patent
Zhang et al.

(10) Patent No.: US 11,846,405 B1
(45) Date of Patent: Dec. 19, 2023

(54) BACKLIGHT MODULE AND DISPLAY DEVICE

(71) Applicant: HKC CORPORATION LIMITED, Shenzhen (CN)

(72) Inventors: Mei Zhang, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/234,348

(22) Filed: Aug. 15, 2023

(30) Foreign Application Priority Data

Nov. 28, 2022 (CN) .......................... 202211498005.2

(51) Int. Cl.
| | |
|---|---|
| *F21V 11/00* | (2015.01) |
| *F21V 11/06* | (2006.01) |
| *G02F 1/13357* | (2006.01) |
| *F21V 17/04* | (2006.01) |
| *F21V 5/02* | (2006.01) |
| *F21Y 105/16* | (2016.01) |
| *F21V 5/00* | (2018.01) |
| *F21Y 115/10* | (2016.01) |

(52) U.S. Cl.
CPC ................ *F21V 11/00* (2013.01); *F21V 5/02* (2013.01); *F21V 11/06* (2013.01); *F21V 17/04* (2013.01); *G02F 1/133606* (2013.01); *F21V 5/00* (2013.01); *F21Y 2105/16* (2016.08); *F21Y 2115/10* (2016.08); *G02F 1/133603* (2013.01)

(58) Field of Classification Search
None
See application file for complete search history.

(56) References Cited

U.S. PATENT DOCUMENTS

2006/0221612 A1    10/2006    Song et al.

FOREIGN PATENT DOCUMENTS

| CN | 104049374 A | 9/2014 |
|---|---|---|
| CN | 106873243 A | 6/2017 |

(Continued)

OTHER PUBLICATIONS

Yang, Yu-qi and Li, Jian-lin, "Backlight Module And Display Device", Aug. 12, 2022, CN 114895494 A image merged with English translation text, 13 pages of image document followed by text. (Year: 2022).*

(Continued)

*Primary Examiner* — Alan B Cariaso

(57) ABSTRACT

A backlight module and a display device are disclosed. The backlight module includes a light board, and multiple light-emitting elements arranged at intervals on the light board. The backlight module further includes a diffusion plate arranged corresponding to the position of the light board and on the side of a light emitting surface of the light board. The diffusion plate includes: multiple blocking walls arranged at intervals on the side of the planar portion adjacent to the light board; and a planar portion arranged parallel to the light board. The blocking walls are perpendicular to the planar portion, and each blocking wall is arranged corresponding to the gap between two adjacent light-emitting elements. The height of the blocking wall is equal to the distance between the diffusion plate and the light board, and the lower part of the blocking wall adjacent to the light board is opaque.

17 Claims, 6 Drawing Sheets

(56) References Cited

FOREIGN PATENT DOCUMENTS

| | | | |
|---|---|---|---|
| CN | 110969952 A | | 4/2020 |
| CN | 111649261 A | | 9/2020 |
| CN | 111739430 A | | 10/2020 |
| CN | 214311209 U | | 8/2021 |
| CN | 113487127 A | | 10/2021 |
| CN | 113759605 A | * | 12/2021 |
| CN | 215264316 U | | 12/2021 |
| CN | 216387655 U | | 4/2022 |
| CN | 114895494 A | * | 8/2022 |
| JP | 2010217349 A | | 9/2010 |
| KR | 20170061535 A | * | 6/2017 |
| WO | 2022160803 A1 | | 8/2022 |
| WO | 2022213560 A1 | | 10/2022 |

OTHER PUBLICATIONS

Wang, Xue-hui and Chen, An-wen, "Backlight Module And Display Device Thereof", Dec. 7, 2021, CN 113759605 A image document merged with English translation text, 16 pages of image document followed by text. (Year: 2021).*

Kim Nam Su and Park Sang Yoon, "Backlight Unit and Liquid Crystal Display Device Using the Same", Jun. 5, 2017, KR 20170061535 A image document merged with English translation text, 14 pages of image document followed by text. (Year: 2017).*

* cited by examiner

BACKLIGHT MODULE AND DISPLAY DEVICE

CROSS-REFERENCE TO RELATED APPLICATIONS

This application claims the priority and benefit of Chinese patent application 2022114980052, titled "Backlight Module and Display Device" and filed Nov. 28, 2022 with China National Intellectual Property Administration, the entire contents of which are incorporated herein by reference.

TECHNICAL FIELD

The present application relates to the field of display technology, and more particularly relates to a backlight module and a display device.

BACKGROUND

The current Mini LED backlight can greatly improve the display quality, comparable to OLED in terms of wide color gamut, ultra-high contrast, and HDR display. Meanwhile, compared with OLEDs of the same size, the price advantage is significant, the cost performance is higher, and the development potential is huge.

However, because the Mini LED backlight adopts the local dimming technology, according to the actual needs of multiple light-emitting elements on the light board, some of them are in an operating state to form a light-emitting region, and some are in a non-operating state to form a non-light-emitting region. The distance between the light-emitting elements is relatively close, so the light in the light-emitting region will diffuse to the non-light-emitting region to cause light interference. As a result, during local dimming, there is still light in the position where the light is not needed, which reduces the contrast of the display panel and affects the display effect of the screen.

Therefore, how to improve the situation of decrease in display contrast due to the diffusion of light from the light-emitting region of the light board to the non-light-emitting region has become an urgent problem in this field.

SUMMARY

In view of the above, it is therefore a purpose of the present application to provide a backlight module and a display device to solve the problem that the display contrast is lowered and the display effect is affected due to the diffusion of light from the light-emitting region of the light board to the non-light-emitting region.

The present application discloses a backlight module including a light board, and a plurality of light-emitting elements are arranged at intervals on the light board. The backlight module further includes a diffusion plate, and the diffusion plate is arranged on the side of the light emitting surface of the light board corresponding to the position of the light board. The diffusion plate includes a plurality of blocking walls and a planar portion. The plurality of blocking walls are arranged at intervals on the side of the planar portion adjacent to the light board. The planar portion is arranged parallel to the light board. The blocking walls are perpendicular to the planar portion, and each blocking wall is arranged corresponding to the gap between two adjacent light-emitting elements. The height of the blocking wall is equal to the distance between the diffusion plate and the light board. The lower part of the blocking wall adjacent to the light board is opaque.

In some embodiments, a light-shielding layer is provided on each of the sides of the blocking wall respectively adjacent to two adjacent light-emitting elements.

In some embodiments, the light-shielding layer is disposed to cover each of the sides of the blocking wall that are respectively adjacent to two adjacent light-emitting elements.

In some embodiments, the light-shielding layer is arranged only on the lower part of the sides respectively adjacent to two adjacent light-emitting elements. The height of the light-shielding layer is smaller than the distance between the diffusion plate and the light board, and greater than or equal to two-thirds of the distance between the diffusion plate and the light board.

In some embodiments, the blocking wall includes a light-shielding portion and a light-transmissive portion. One side of the light-transmissive portion is connected to the planar portion, and the other side is connected to one side of the light-shielding portion. The other side of the light-shielding portion is in contact with the light board. The height of the light-transmissive portion is smaller than that of the light-shielding portion.

In some embodiments, the blocking wall is formed by protruding from the planar portion toward the light board, and is integrally formed with the planar portion.

In some embodiments, the side of the planar portion adjacent to the light board is provided with a plurality of slots. Each blocking wall is inserted into the respective slot and is interference-fitted with the respective slot. The number of the blocking walls is less than or equal to the number of the slots.

In some embodiments, the plurality of blocking walls include a first blocking wall, a second blocking wall, a third blocking wall and a fourth blocking wall connected end to end in sequence. Each of the light-emitting elements is located in an area surrounded by the first blocking wall, the second blocking wall, the third blocking wall and the fourth blocking wall.

In some embodiments, at least two adjacently arranged light-emitting elements form a light-emitting region, and every four of the blocking walls are arranged around the light-emitting region.

The present application further includes a display device, including a display panel. The display device further includes the above-mentioned backlight module, and the backlight module is arranged on the side of the light-incident surface of the display panel.

The present application improves the structure of the diffusion plate in the backlight module, where the diffusion plate with only a single structure is improved into a diffusion plate with two structures including a planar portion and a blocking wall. When the diffusion plate is placed above the light board, the blocking wall abuts against the light board to form a support, effectively preventing the diffusion plate from being suspended in a large area and falling down, so that the diffusion plate is not easily deformed, and the two adjacent light-emitting elements on the light board are spaced apart by the blocking wall. When the display panel performs local dimming, the light of the light-emitting element in the operating state is emitted from the bottom to the top. Since the lower part of the blocking wall 111 is opaque, part of the light emitted by the light-emitting element in operating state is blocked by the lower part of the blocking wall, reducing the light from the light-emitting region spreading to the non-emitting area, thereby improving the contrast ratio and the display effect of the display panel.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative. In the drawings.

Figure 1:
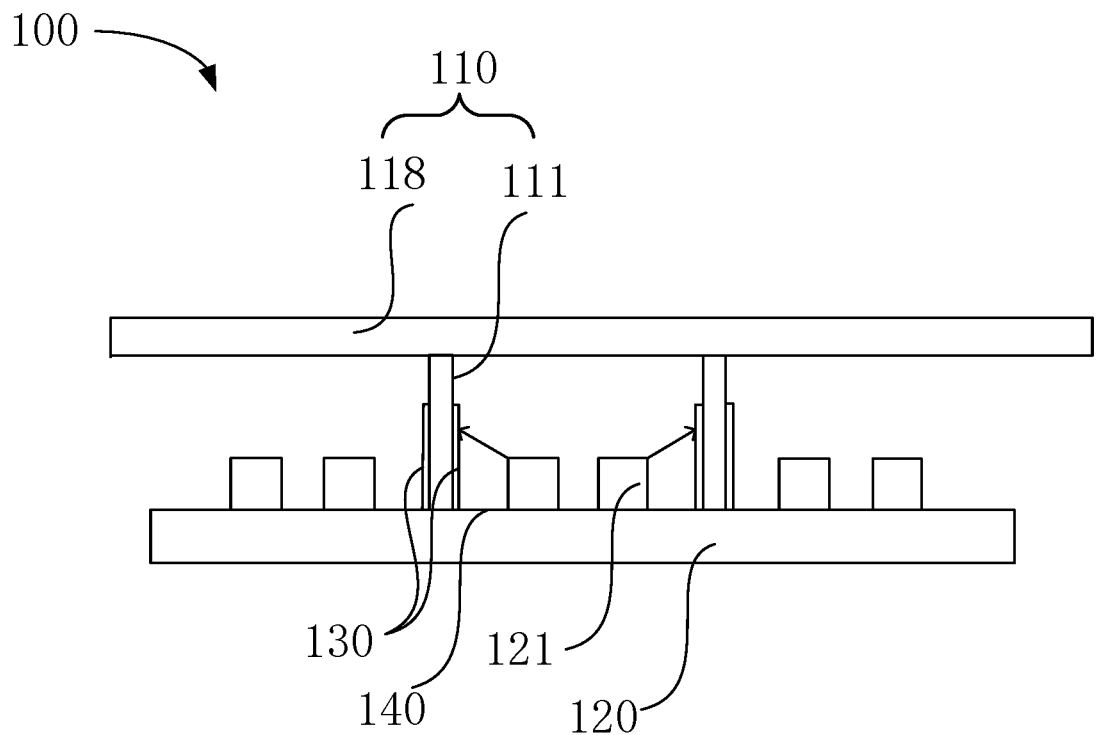
FIG. 1 is a partial schematic diagram of a first embodiment of a backlight module according to the present application.

In the drawings: 10, display device; 100, backlight module; 200, display panel; 110, diffusion plate; 111, blocking wall; 112, light-shielding portion; 113, light-transmissive portion; 114, first blocking wall; 115, second blocking wall; 116, third blocking wall; 117, fourth blocking wall; 118, planar portion; 119, slot; 120, light board; 121, light-emitting element; 130, shading layer; 140, light-emitting region; 150, receiving slot; 151, positioning slot; 152, first light-transmissive portion; 153, second light-transmissive portion; 160, prism structure.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "perpendicular", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application may be understood depending on specific contexts.

The present application will be described in detail below with reference to the accompanying drawings and optional embodiments. It should be noted that, should no conflict is present, the various embodiments or technical features described below may be combined arbitrarily to form new embodiments.

FIG. 1 is a partial schematic diagram of a first embodiment of a backlight module according to the present application. As shown in FIG. 1, the present application discloses a backlight module 100, including a light board 120 on which a plurality of light-emitting elements 121 are arranged at intervals. The backlight module 100 further includes a diffusion plate 110. The diffusion plate 110 is arranged above the light board 120 at a position corresponding to the light board 120. The diffusion plate 110 includes a plurality of blocking walls 111 and a surface 118. The plurality of blocking walls 111 are arranged at intervals on the side of the planar portion 118 adjacent to the light board 120. The planar portion 118 is arranged parallel to the light board 120. The blocking walls 111 are perpendicular to the planar portion 118, and each blocking wall 111 is arranged corresponding to the gap between two adjacent light-emitting elements 121. The height of the blocking wall 111 is equal to the distance between the diffusion plate 110 and the light board 120, and the lower parts of the sides of the blocking wall 111 adjacent to the two adjacent light-emitting elements 121 are opaque to light.

When the size of a TV or other display device is greater than 60 inches, and the diagonal length is 152.4 cm, since the diffusion plate itself is thin and prone to deformation. When the size of the diffusion plate of a TV or other display device is large, the middle part of the diffusion plate will easily collapse due to the action of its own gravity without support.

This application improves the structure of the diffusion plate 110 by improving the diffusion plate 110 with only a single structure to a diffusion plate 110 with two structures including a planar portion 118 and a blocking wall 111. The blocking wall 111 may be arranged perpendicular to the planar portion 118, and the planar portion 118 serves the light processing function of a diffuser.

When the diffusion plate 110 is placed above the light board 120, the blocking walls 111 abut against the light board 120. The blocking walls 111 stand on the light board 120 to form a support for the planar portion 118, and the planar portion 118 is a component that mainly functions as the diffusion plate 110. After the originally thin planar portion 118 is supported from multiple different positions by the plurality of blocking walls 111, it can effectively prevent the planar portion 118 from being suspended in a large area and fall down, so that the planar portion 118 is not easily deformed, and may better play the function of the diffusion plate 110, causing the light to refract, reflect, and scatter in different directions, thereby changing the path of light, and achieving sufficient dispersion of incident light to create the effect of optical diffusion.

Furthermore, two adjacent light-emitting elements on the light board 120 are separated by a blocking wall 111. When the display panel 200 performs local dimming, the light from the light-emitting element 121 in the operating state is emitted from bottom to top and diverges in a fan shape. The lower part of the blocking wall 111 is opaque, so part of the divergent light emitted by the light-emitting element 121 in the operating state is blocked by the lower part of the blocking wall 111, reducing the light from the light-emitting region 140 spreading to the non-light-emitting region 140, thereby improving the contrast and enhancing the display effect of the display panel 200, and effectively solving the problem that the display contrast is reduced due to the light from the light-emitting region 140 of the light board 120 diffusing to the non-light-emitting region, which affects the display effect.

As shown in FIG. 1, the blocking wall 111 is formed by protruding the planar portion 118 toward the direction of the light board 120, and is integrally formed with the planar portion 118, so that the blocking wall 111 is not easy to fall off from the planar portion 118, which increases the service life of the blocking wall 111 and improves the structural stability of the diffusion plate 110, so that the blocking wall 111 can continuously block the divergent light, further improving the display quality of the display panel 200. Of course, the blocking wall 111 and the planar portion 118 can also be detachably fixed to each other. The present application does not specifically limit the connection method between the blocking wall 111 and the planar portion 118. In this embodiment, the integral design of the blocking wall 111 and the planar portion 118 is merely used as an example for illustration purposes.

Further, a light-shielding layer 130 is arranged on the sides of the blocking wall 111 respectively adjacent to two adjacent light-emitting elements 121. The material of the light-shielding layer 130 may be black ink or black resin, etc. By coating the light-shielding layer 130 on the sides of the blocking wall 111, the blocking wall 111 can have a light-shielding effect, so that the blocking wall 111 can block the light spreading from the light-emitting element 121 to the non-light-emitting region, thereby preventing light interference and reduction of contrast.

The light-shielding layer 130 is only disposed on the lower part of each of the sides respectively adjacent to two adjacent light-emitting elements 121. The height of the light-shielding layer 130 is less than the distance between the diffusion plate 110 and the light board 120, and greater than or equal to two-thirds of the distance between the diffusion plate 110 and the light board 120.

When the display panel 200 performs local dimming, the light from the light-emitting element 121 in the operating state is emitted from bottom to top and diverges in a fan shape, so the lower part of the blocking wall 111 is the most likely part where the light tends to pass through and continue to diverge. Therefore, the light-shielding layer 130 may be arranged only on the lower parts of the sides respectively adjacent to two adjacent light-emitting elements 121, and when the height of the light-shielding layer 130 is greater than two-thirds of the distance between the diffusion plate 110 and the light board 120, the light-shielding layer 130 can block most of the light diffusing from the light-emitting element 121 to the non-light-emitting region at the lower part of the blocking wall 111, reducing the light from the light-emitting region 140 spreading to the non-light-emitting region 140, thereby improving the contrast. Thus, the problem that the display contrast is lowered and the display effect is affected due to the diffusion of light from the light-emitting region 140 of the light board 120 to the non-light-emitting region is effectively improved.

In addition, in the design of the diffusion plate, in order to make the diffusion plate directly face the light board and make the light emitted by the light-emitting element pass through the diffusion plate, the diffusion plate may be installed to directly face the light board. However, when installing the diffusion plate, it may be misaligned with the light board. Therefore, this application also improves the light board, as follows.

Figure 2:
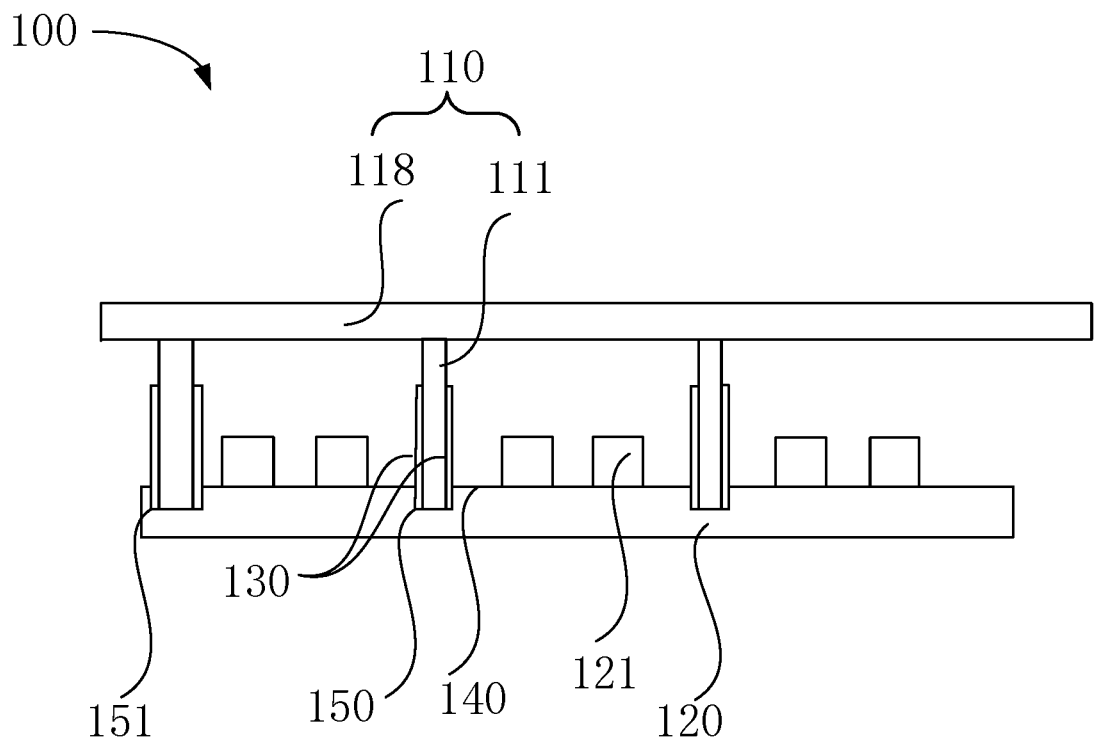
FIG. 2 is a partial schematic diagram of a second embodiment of the backlight module according to the present application.

FIG. 2 is a partial schematic diagram of a second embodiment of the backlight module according to the present application. As shown in FIG. 2, the embodiment shown in FIG. 2 is an improvement based on FIG. 1. The position of the light board 120 corresponding to the blocking wall 111 is provided with a receiving slot 150. The side of the blocking wall 111 away from the planar portion 118 is inserted into the receiving slot 150, and fitted to the receiving slot 150. The receiving slot 150 includes a positioning slot 151. There are at least two positioning slots 151, which are arranged at opposite corners of the light board 120.

In this embodiment, by setting the receiving slot 150 in the light board 120 at the position corresponding to the blocking wall 111 of the diffusion plate 110, when the diffusion plate 110 is installed on the light board 120, the blocking wall 111 may be inserted into the receiving slot 150 so that a part of the blocking wall 111 is fixed in the receiving slot 150, and since the blocking wall 111 and the planar portion 118 are integrally formed, the entire diffusion plate 110 and the light board 120 are fixed to each other, thereby improving the stability of the installation of the diffusion plate.

At the same time, since the receiving slot 150 is provided in the light board 120, the installation position between the receiving slot 150 and the blocking wall 111 may be easily observed visually, which is convenient for quick positioning when installing the diffusion plate 110. In addition, positioning slots 151 are provided at the opposite corners of the light board 120. When the blocking wall 111 is inserted into the positioning slot 151 at the diagonal corner of the light board 120, the diffusion plate 110 will be limited in the direction along the diagonal of the light board 120, so that the position of the diffusion plate 110 will not easily shift and meanwhile the diffusion plate 110 is installed to directly face the light board 120, which avoids repeated alignment between the diffusion plate 110 and the light board 120, improves the assembly speed, and further improves the production efficiency.

Figure 3:
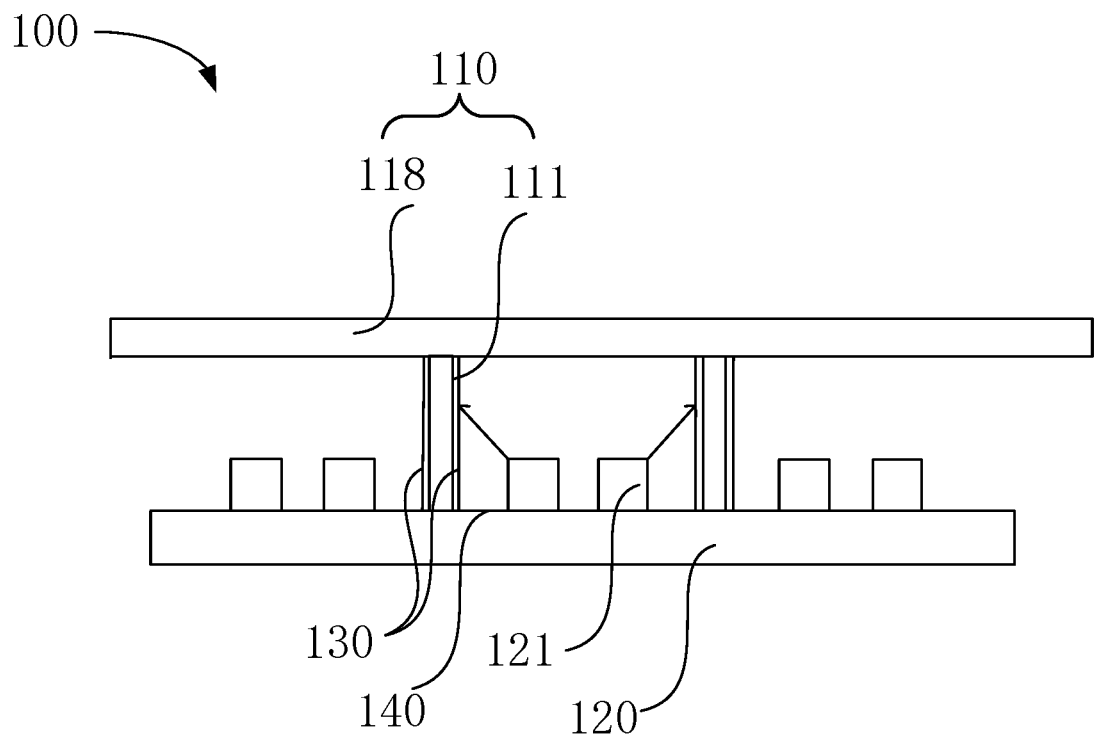
FIG. 3 is a partial schematic diagram of a third embodiment of the backlight module according to the present application.

FIG. 3 is a partial schematic diagram of the third embodiment of the backlight module according to the present application. As shown in FIG. 3, the embodiment shown in FIG. 3 is an improvement based on FIG. 1, in particular, the light-shielding layer 130 is disposed to cover the sides of the blocking wall 111 respectively near the two adjacent light-emitting elements 121.

The difference between this embodiment and the embodiment shown in FIG. 1 lies in that in this embodiment the light-shielding layer 130 is provided on each of both sides of the blocking wall 111 adjacent to the two adjacent light-emitting elements, and because the height of the blocking wall 111 is equal to the distance between the light board 120 and the diffusion plate 110, the blocking wall 111 forms a covered shading around the surrounding area, whereby the light diverging from the light-emitting element 121 to the surrounding area will be blocked by the light-shielding layer 130 on the blocking wall 111, preventing light from diffusing from the light-emitting region 140 to the non-light-emitting region. Thus, the blocking effect on divergent light is further improved, and the problem that the display contrast is lowered and the display effect is affected due to the diffusion of light from the light-emitting region 140 of the light board 120 to the non-light-emitting region is improved.

Figure 4:
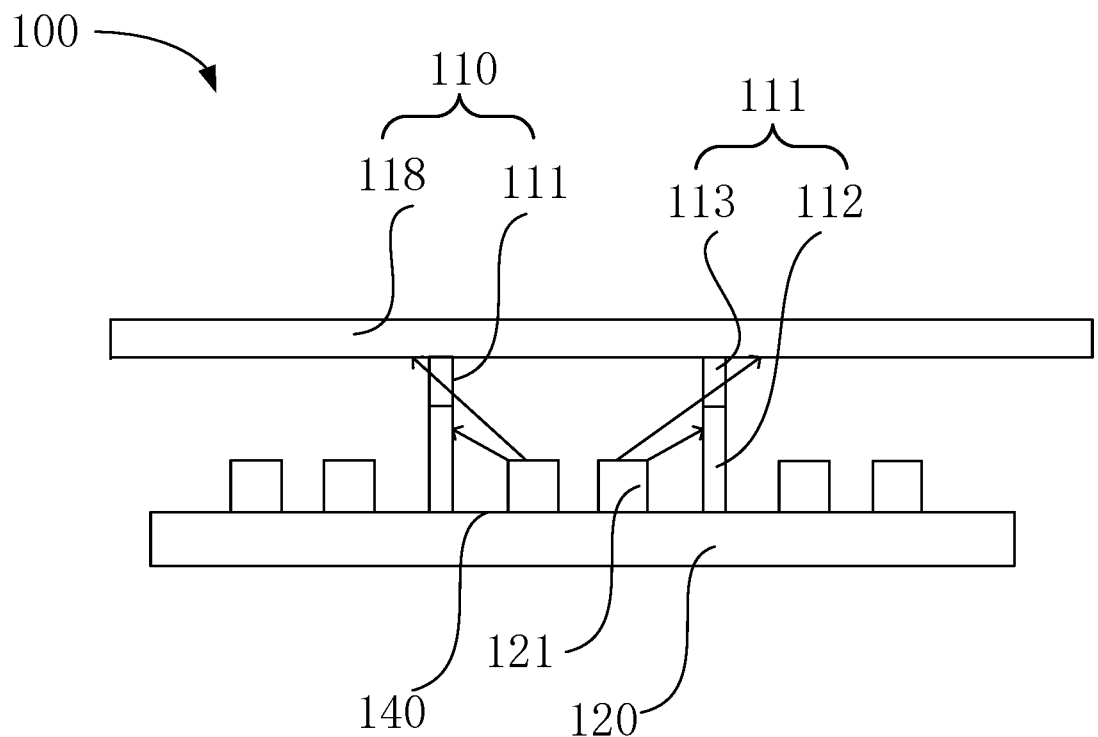
FIG. 4 is a partial schematic diagram of a fourth embodiment of the backlight module according to the present application.

FIG. 4 is a partial schematic diagram of a fourth embodiment of the backlight module according to the present application. As shown in FIG. 4, the embodiment shown in FIG. 4 is an improvement based on FIG. 1. The blocking wall 111 includes a light-shielding portion 112 and a light-transmissive portion 113. One side of the light-transmissive portion 113 is connected to the planar portion 118, and the other side is connected to one side of the light-shielding portion 112. The other side of the light shielding part 112 abuts against the light board 120. The height of the transparent portion 113 is smaller than that of the light shielding portion 112.

The difference between this embodiment and the embodiment shown in FIG. 1 lies in that in this embodiment the blocking wall 111 is composed of two parts: a light-shielding portion 112 and a light-transmissive portion 113, where the light-transmissive portion 113 is made of a transparent material that allows light to pass through, and the light-shielding film is made of a light-shielding material that can block light; that is, the shading effect of the blocking wall 111 is created by the blocking wall 111 itself. Furthermore, one side of the light-transmissive portion 113 with transparency is connected to the planar portion 118, and the other side is connected to the light shielding part 112, so that when the diffusion plate 110 is installed above the light board 120, the light-transmissive portion 113 is positioned above the light shielding part 112, and the light-shielding portion 112 abuts against the light board 120 and stands on the light board 120 to form a support.

When the Mini LED backlight module 100 performs local dimming, the light from the light-emitting element 121 in the operating state is emitted from bottom to top and diverges in a fan shape. Since the light-shielding portion 112 at the lower part of the blocking wall 111 is opaque, part of the divergent light emitted by the light-emitting element 121 in the operating state is blocked by the light-shielding portion 112, which reduces the diffusion of light from the light-emitting region 140 to the non-light-emitting region, thereby improving the contrast and improving the display effect of the display panel 200, and effectively improving the problem that the display contrast is lowered and the display effect is affected due to the diffusion of light from the light-emitting region 140 of the light board 120 to the non-light-emitting region.

Since the height of the light-transmissive portion 113 is smaller than that of the light-shielding portion 112, most of the diverging light will be blocked by the light-shielding portion 112, while a small part of the diverging light will be emitted through the light-transmissive portion 113 disposed on the upper part of the blocking wall 111. Since the light-transmissive portion 113 itself has a certain thickness, when the light enters from one side of the light-transmissive portion 113 and exits from the other side, refraction will occur. After the light is refracted to the target partition through the light-transmissive portion 113, the area of the halo may be further reduced. In this way, light spot may be created near the position where the blocking wall 111 is connected to the diffusion plate 110, and this light spot may be connected with the light emitted by the light-emitting region 140, effectively improving the phenomenon of dark grid stripes on the display caused by the blocking walls 111 installed on the diffusion plate 110, thus further improving the display effect of the display panel 200.

It should be noted that the thickness of the light-transmissive portion 113 mentioned in this application refers to the width of the light-transmissive portion 113 in the horizontal direction. Due to the principle of light refraction, the thickness of the light-transmissive portion 113 will directly affect the range of light refraction, so the thickness of the light-transmissive portion 113 can also be smaller than the thickness of the light-shielding portion 112. The narrower light-transmissive portion 113 can make the positional deviation of the light when refracted through the light-transmissive portion 113 smaller, which can effectively prevent the decrease of display contrast caused when the light emitted from the light-transmissive portion 113 diverges to the non-light-emitting region, while further reducing the area of the halo.

Figure 5:
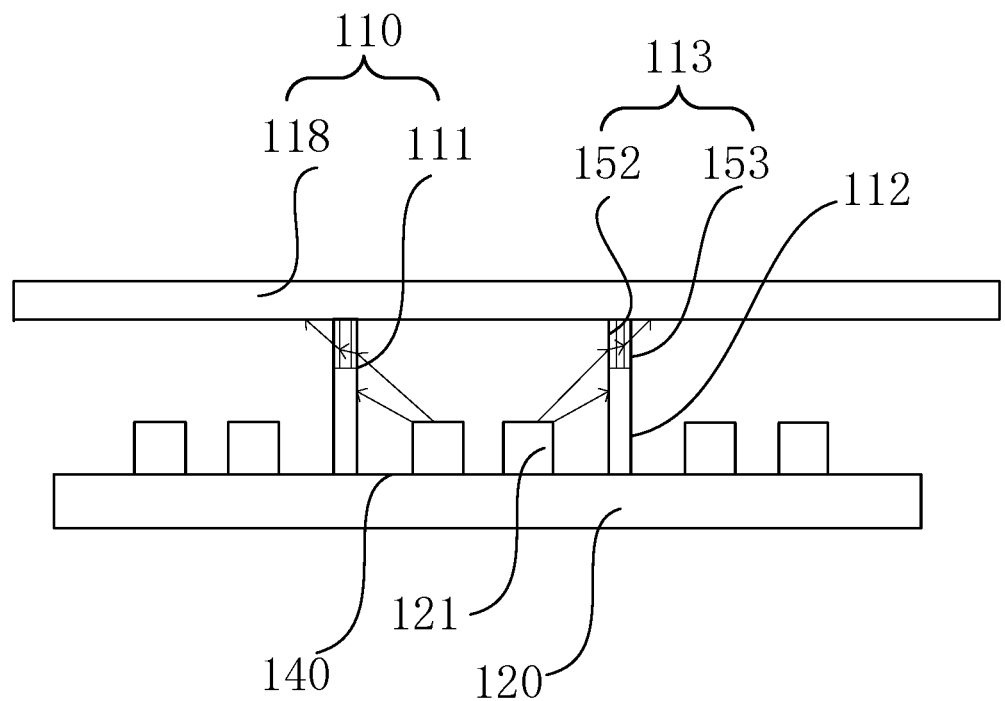
FIG. 5 is a partial schematic diagram of a fifth embodiment of the backlight module according to the present application.

FIG. 5 is a partial schematic diagram of a fifth embodiment of the backlight module according to the present application. As shown in FIG. 5, the embodiment shown in FIG. 5 is an improvement based on FIG. 4. The light-transmissive portion 113 includes a first light-transmissive portion 152 and a second light-transmissive portion 153. The first light-transmissive portion 152 and the second light-transmissive portion 153 are arranged at intervals, and the first light-transmissive portion 152 and the second light-transmissive portion 153 have the same thickness.

The difference between this embodiment and the previous embodiment is that the light-transmissive portion 113 in this embodiment includes two parts, namely the first light-transmissive portion 152 and the second light-transmissive portion 153. One side of the first light-transmissive portion 152 and the second light-transmissive portion 153 are connected to the planar portion, and the other side is connected to the light-shielding portion 112 to form a complete diffusion plate 110. When the light is emitted from the light-emitting element 121, since the light is diverged from bottom to top, part of the light that diverges toward the non-light-emitting region will be blocked by the light-shielding portion 112 at the bottom, reducing the diffusion of light from the light-emitting region 140 to the non-light-emitting region and improves the contrast. This effectively solves the problem that the display contrast is reduced because the light from the light-emitting region 140 of the light board 120 diffuses to the non-light-emitting region, which affects the display effect. Another part of the light that is not blocked by the light-shielding portion will first enter the first light-transmissive portion 152 when passing through the light-transmissive portion, and then exit from the first light-transmissive portion 152, and enter the air between the first light-transmissive portion 152 and the second light-transmissive portion 153, and then enter the second light-transmissive portion 153 from the air, and finally pass through the second light-transmissive portion 153. That is to say, when the light passes through the first light-transmissive portion 152 and the second light-transmissive portion 153, multiple refractions occur, which changes the final path of the light and converges the light toward the direction of the light-emitting region while reducing the area of halo produced, effectively improving the display effect of the display panel.

Further, in order to avoid light loss in the light-emitting region 140 that occurs after the light passes through the light-transmissive portion 113, the present application also improves the structure of the blocking wall 111, specifically the light-transmissive portion 113, as follows.

Figure 6:
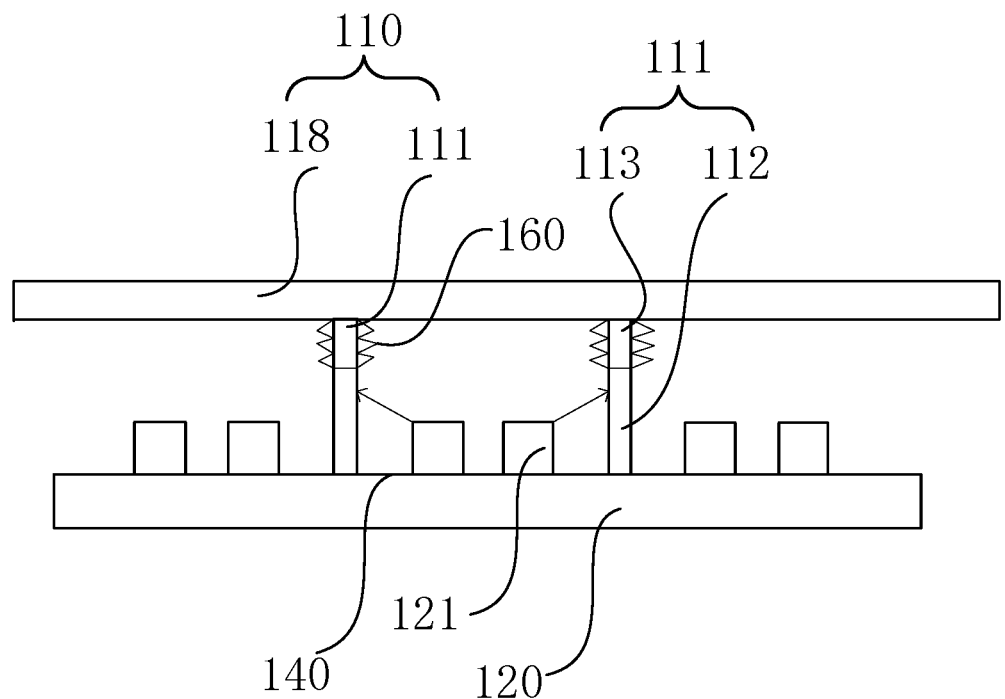
FIG. 6 is a partial schematic diagram of a sixth embodiment of the backlight module according to the present application.

FIG. 6 is a partial schematic diagram of a sixth embodiment of the backlight module according to the present application. As shown in FIG. 6, the embodiment shown in FIG. 6 is an improvement based on FIG. 4. The sides of the light-transmissive portion 113 respectively near the sides of two adjacent light-emitting elements 121 are provided with a plurality of prism structures 160, and the plurality of prism structures 160 are arranged along the sides of the light-transmissive portion 113 in a direction from the light board 120 to the planar portion 118.

The difference between this embodiment and the embodiment shown in FIG. 4 is that in this embodiment a plurality of prism structures 160 are arranged on the side of the light-transmissive portion 113, and the light rays irradiated on the light-transmissive portion 113 are refracted and reflected multiple times by the multiple prism structures 160, changing the original propagation path of the light, so that the light converges toward the direction directly facing the light-emitting region, which can effectively improve the light loss of the light-emitting region 140 caused by the light passing through the light-transmissive portion 113, and further enhance the brightness of the light-emitting region 140 in the bright state, thus improving the display quality of the display panel 200.

Figure 7:
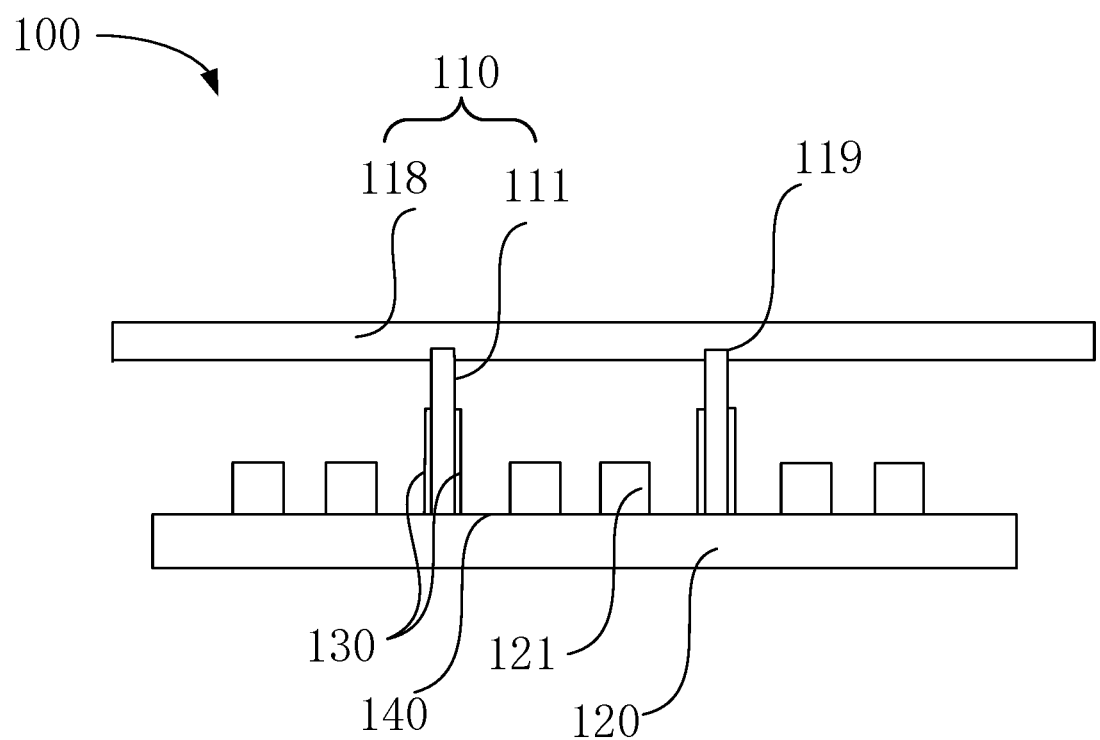
FIG. 7 is a partial schematic diagram of a seventh embodiment of the backlight module according to the present application.

FIG. 7 is a partial schematic diagram of a seventh embodiment of the backlight module according to the present application. As shown in FIG. 7, the embodiment shown in FIG. 7 is an improvement based on FIG. 1. The side of the planar portion 118 adjacent to the light board 120 is provided with a plurality of slots 119. Each blocking wall 111 is inserted into the respective slot 119 and is in an interference fit with the respective slot 119. The number of the blocking walls 111 is less than or equal to the number of the slots 119.

The difference between this embodiment and the embodiment shown in FIG. 1 is that in this embodiment the planar portion 118 and the blocking wall 111 of the diffusion plate 110 are detachable structures. In the actual installation process, a plurality of blocking walls 111 may be inserted into the slots 119 of the planar portion 118 one by one, and through the interference fit between the blocking walls 111 and the slots 119, the blocking walls 111 may be fixed in the slots 119, and they are not easy to fall off. Then the installed diffusion plate 110 may be placed on the light board 120 for assembly.

During use, when some damaged blocking walls 111 need to be replaced, only the blocking walls 111 are replaced without replacing the entire diffusion plate 110, which makes maintenance more convenient and saves material costs.

More importantly, due to the detachable design of the slots 119 and the blocking walls 111 in this embodiment, the blocking walls 111 of different heights may be replaced according to the actual demand for the OD value (OD stands for optical distance, which refers to the distance between the diffusion plate and the upper surface of the light board, also called the light mixing distance) of the light board 120, so that the distance between the light board 120 and the diffuser panel 110 may be flexibly adjusted according to the required OD value. In addition, a corresponding number of blocking walls 111 may be set to be inserted into some of the slots 119, or all the slots 119 may be inserted with the blocking walls 111. For example: when it is needed to shield the light at a local position on the light board 120 where the light diverges obviously from the light-emitting region 140 towards the non-light-emitting region, the blocking walls 111 may be inserted into some slots 119 in a targeted manner, so that the light-emitting region 140 composed of a plurality of light-emitting elements 121 may be shielded by the blocking walls 111, which effectively solves the problem that the display contrast is reduced and the display effect is affected due to the light from the light-emitting region 140 at some positions of the light board 120 diffusing to the non-light-emitting region.

It is also possible to insert all the slots 119 with the blocking walls 111, whereby each light-emitting element 121 is shielded by the blocking wall 111, forming a high-density light-shielding effect, and preventing the light emitted by the light-emitting element in the operating state from diffusing to the light-emitting element in the non-operating state thus reducing the contrast ratio.

Figure 8:
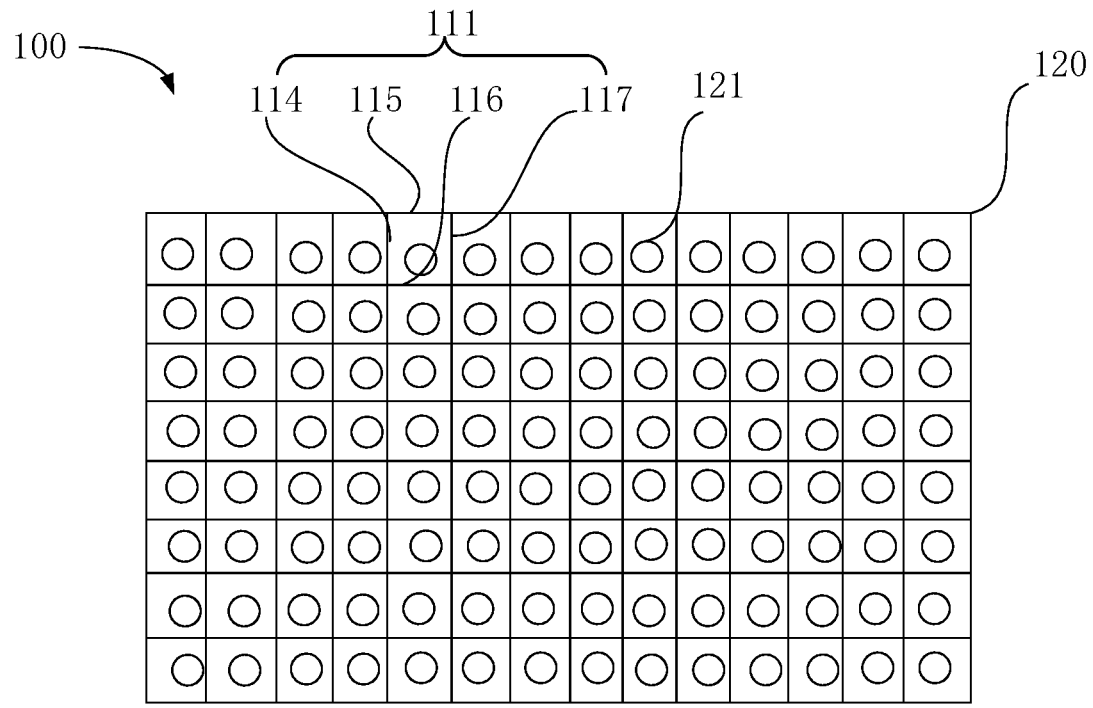
FIG. 8 is a top view of an eighth embodiment of the backlight module according to the present application.

FIG. 8 is a top view of an eighth embodiment of the backlight module according to the present application. As shown in FIG. 8, the plurality of blocking walls 111 include a first blocking wall 114, a second blocking wall 115, a third blocking wall 116, and a fourth blocking wall 117 connected end to end in sequence. Each light-emitting element 121 is located in an area surrounded by the first blocking wall 114, the second blocking wall 115, the third blocking wall 116 and the fourth blocking wall 117.

In the light board 120 of Mini LED, each light-emitting element 121 can emit light or not emit light, and the light emitted by each light-emitting element 121 in the operating state may diffuse toward the direction of the adjacent non-operating light-emitting element 121, resulting in a decrease in contrast. Therefore, in order to further prevent the mutual influence of light diffusion between each light-emitting element 121.

In this embodiment, improvements are made to the arrangement of the blocking walls 111. As shown in FIG. 5, the first blocking wall 114, the second blocking wall 115, the third blocking wall 116, and the fourth blocking wall 117 connected end to end are used to form a square structure. When the diffusion plate 110 is placed above the light board 120, each light-emitting element 121 is located in a square-shaped structure, and each light-emitting element 121 is surrounded by four blocking walls 111, forming a "point shading" so that the light emitted by the light-emitting element 121 cannot be diffused around, and there will be no problem of light diffusion interference between two adjacent light-emitting elements 121, which further improves the contrast.

Of course, the shape surrounded by the first blocking wall 114, the second blocking wall 115, the third blocking wall 116 and the fourth blocking wall 117 is not necessarily a square shape, but also may be other shapes, such as rhombus, parallelogram, etc., which can also achieve the above effects. Due to space limitation, details will not be repeated one by one. This application only uses the first blocking wall 114, the second blocking wall 115, the third blocking wall 116 and the fourth blocking wall 117 to form a square structure as an example for illustration.

Figure 9:
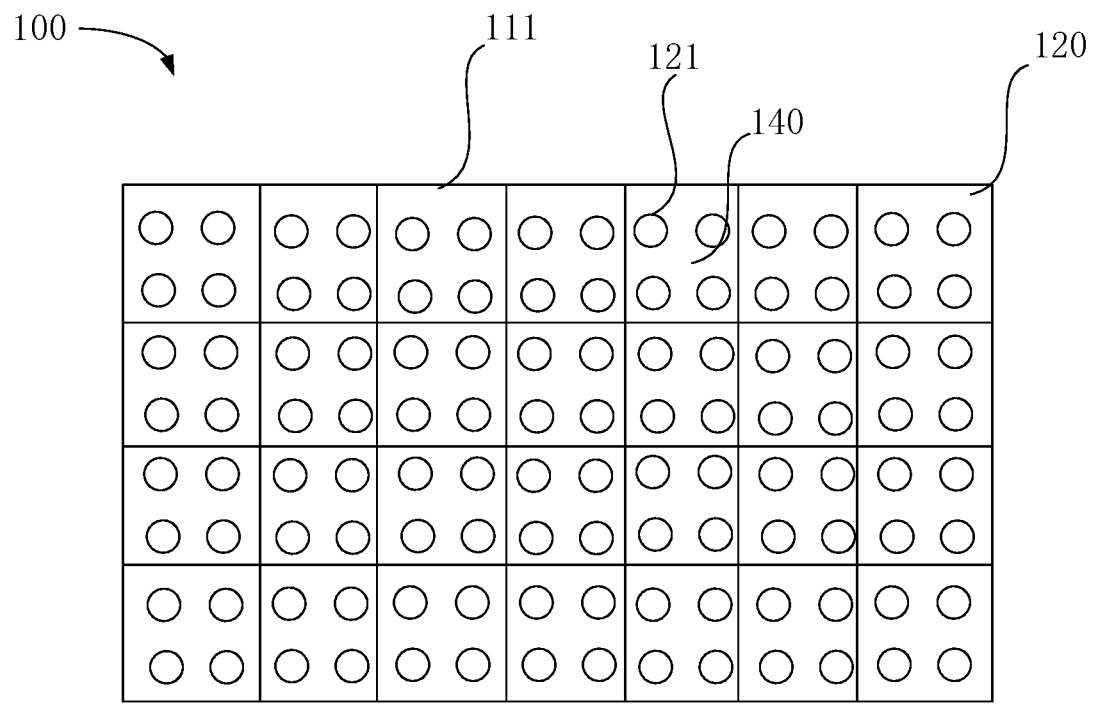
FIG. 9 is a top view of a ninth embodiment of the backlight module according to the present application.

FIG. 9 is a top view of a ninth embodiment of the backlight module according to the present application. As shown in FIG. 9, at least two adjacent light-emitting elements 121 form a light-emitting region 140, and a plurality of blocking walls 111 are arranged around the light-emitting region 140.

The difference between this embodiment and the previous embodiment is that in this embodiment the light-emitting region 140 composed of at least two adjacent light-emitting elements 121 is shielded by a plurality of blocking walls 111, forming a "surface light-shielding". In this way, the number of blocking walls 111 may be effectively reduced, and while the cost may be saved, it can effectively avoid the phenomenon of dark lattice stripes on the display due to excessive density of the blocking walls 111, thereby further optimizing the display effect.

As shown in FIG. 9, when four adjacent light-emitting elements 121 emit light together to form a light-emitting region 140, the resulting brightness is relatively apparent. The regional light formed by the four light-emitting elements 121 diffuses to the surrounding non-light-emitting region 140, and the influence on the non-light-emitting region 140 is also relatively obvious. In this embodiment, a plurality of blocking walls 111 surround the light-emitting region 140 composed of four adjacent light-emitting elements 121, which can prevent the regional light emitted by the four light-emitting elements 121 from spreading to the surrounding non-light-emitting regions to cause obvious light interference, effectively improving the problem that the display contrast is reduced and the display effect is affected due to the diffusion of light from the light-emitting region 140 of the light board 120 to the non-light-emitting region.

It should be noted that, in this embodiment, the number of blocking walls 111 and the enclosed shape depend on the number of light-emitting elements 121 forming the light-emitting region 140. For example, when the number of light-emitting elements 121 in the light-emitting region 140 is two, the number of blocking walls 111 surrounding the light-emitting region 140 may be four, forming a square shape. When the number of light-emitting elements 121 in the light-emitting region 140 is three, the number of blocking walls 111 surrounding the light-emitting region 140 may be three, forming a triangle. In this embodiment, when the number of light-emitting elements 121 in the light emitting region 140 is two, the number of blocking walls 111 surrounding the light emitting region 140 is four, which are enclosed in a square shape for illustration.

Figure 10:
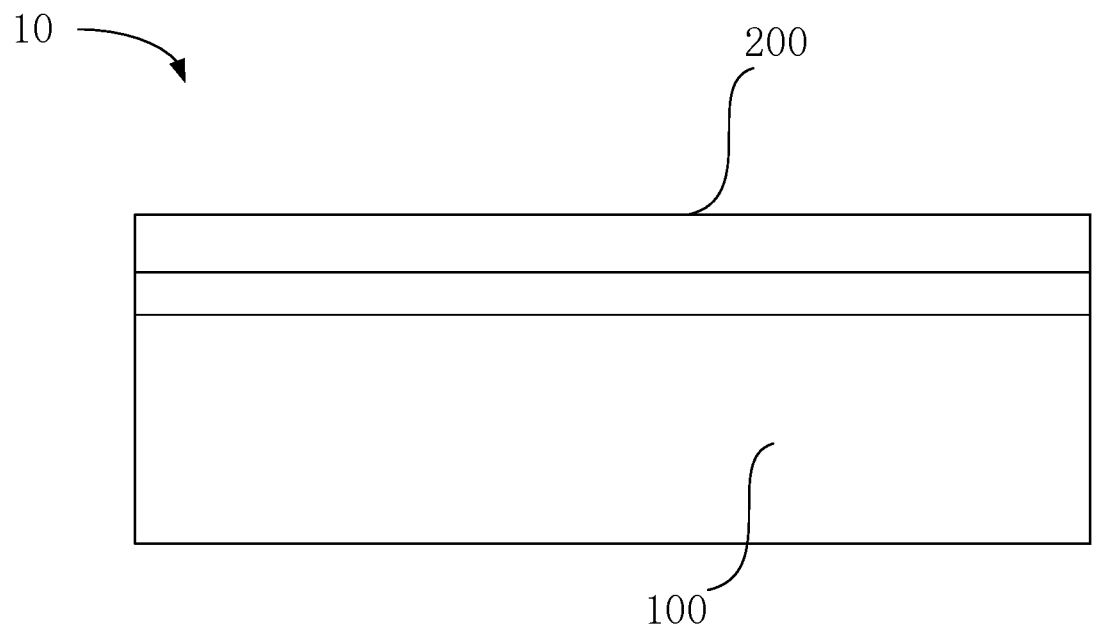
FIG. 10 is a schematic diagram of an embodiment of a display device according to the present application.

FIG. 10 is a schematic diagram of an embodiment of a display device according to the present application. As shown in FIG. 10, the present application further includes a display device 10 including a display panel 200. The display device 10 further includes the above-mentioned backlight module 100, and the backlight module 100 is disposed on the side of a light-incident surface of the display panel 200.

The display panel 200 does not emit light by itself, and the backlight module 100 is required to provide a normal light source for the display panel 200. The backlight module 100 is arranged on the side of the light incident surface of the display panel 200 so that the light emitted by the backlight module 100 can pass through the display panel 200 so that the display panel 200 can display normally.

In the Mini LED backlight module 100, since the mode of local dimming is adopted, according to actual needs, some of the light-emitting elements 121 on the light board 120 in the backlight module 100 are in the operating state to form the light-emitting region 140, and some are in the non-operating state to form the non-light-emitting region. However, since the operating light-emitting element 121 is relatively adjacent to the non-operating light-emitting element 121, the light from the light-emitting region 140 will diffuse to the non-light-emitting region 140 to form light interference, which causes light to remain in positions where no light is needed during local dimming, which reduces the contrast of the display panel 200 and affects the display effect of the images.

Based on the above-mentioned problems, the present application improves the backlight module 100 in the display device 10, and specifically improves the structure of the diffusion plate 110 in the backlight module 100, where the diffusion plate 110 with only a single structure is improved into a diffusion plate 110 with two structures including a planar portion 118 and a blocking wall 111. When the diffusion plate is placed above the light board 120, the blocking wall 111 abuts against the light board 120 to form a support, effectively preventing the diffusion plate 110 from being suspended in a large area and falling down, so that the diffusion plate 110 is not easily deformed, and the two adjacent light-emitting elements on the light board 120 are spaced apart by the blocking wall 111. When the display panel 200 performs local dimming, the light of the light-emitting element 121 in the operating state is emitted from the bottom to the top. Since the lower parts on both sides of the blocking wall 111 are opaque, part of the light emitted by the light-emitting element 121 in operating state is blocked by the lower part of the blocking wall 111, reducing the light from the light-emitting region 140 spreading to the non-emitting area 140, thereby improving the contrast ratio and the product quality of the display device 10.

It should be noted that the inventive concept of the present application may be formed into many embodiments, but the length of the application document is limited and so these embodiments cannot be enumerated one by one. The technical features may be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
    a light board;
    a plurality of light-emitting elements, arranged at intervals on the light board; and
    a diffusion plate, arranged corresponding to a position of the light board and on a side of a light emitting surface of the light board; wherein the diffusion plate comprises a plurality of blocking walls and a planar portion, wherein the plurality of blocking walls are arranged at intervals on a side of the planar portion adjacent to the light board, and the planar portion is arranged parallel to the light board; wherein the plurality of blocking walls are disposed perpendicular to the planar portion, and wherein each of the blocking wall is arranged corresponding to a gap between two adjacent light-emitting elements;

wherein a height of the blocking wall is equal to a distance between the diffusion plate and the light board, and wherein a lower part of the blocking wall adjacent to the light board is opaque;

wherein each blocking wall comprises a light-shielding portion and a light-transmissive portion, wherein one side of the light-transmissive portion is connected to the planar portion, and another side is connected to one side of the light-shielding portion, and wherein another side of the light-shielding portion abuts against the light board; wherein a height of the light-transmissive portion is less than that of the light-shielding portion;

wherein the light-transmissive portion comprises a first light-transmissive portion and a second light-transmissive portion, which are spaced apart, and wherein the first light-transmissive portion and the second light-transmissive portion have a same thickness.

2. The backlight module of claim 1, wherein a light-shielding layer is arranged on each of sides of the blocking wall that are respectively adjacent to the two adjacent light-emitting elements.

3. The backlight module of claim 2, wherein the light-shielding layer is disposed only on a lower part of each of the sides of blocking wall that are respectively adjacent to the two adjacent light-emitting elements;

wherein a height of the light-shielding layer is less than the distance between the diffusion plate and the light board, and greater than or equal to two-thirds of the distance between the diffusion plate and the light board.

4. The backlight module of claim 2, wherein a material of the light-shielding layer comprises black ink or black resin.

5. The backlight module of claim 1, wherein each blocking wall is formed by protruding from the planar portion toward the light board, and is integrally formed with the planar portion.

6. The backlight module of claim 1, wherein a plurality of slots are defined in a side of the planar portion adjacent to the light board, and wherein each of the blocking walls is inserted into the respective slot and is interference-fitted with the respective slot; wherein a number of the blocking walls is less than or equal to a number of the slots.

7. The backlight module of claim 1, wherein the plurality of blocking walls comprise a first blocking wall, a second blocking wall, a third blocking wall, and a fourth blocking wall that are connected end to end in sequence, wherein each of the light-emitting elements is located in an area surrounded by the first blocking wall, the second blocking wall, the third blocking wall, and the fourth blocking wall.

8. The backlight module of claim 7, wherein the first blocking wall, the second blocking wall, the third blocking wall, and the fourth blocking wall form a square-shaped structure.

9. The backlight module of claim 7, wherein the first blocking wall, the second blocking wall, the third blocking wall, and the fourth blocking wall form a parallelogram-shaped structure.

10. The backlight module of claim 7, wherein the first blocking wall, the second blocking wall, the third blocking wall, and the fourth blocking wall form a rhombus-shaped structure.

11. The backlight module of claim 1, wherein at least two of the light-emitting elements that are arranged adjacently form a light-emitting region, and wherein every four of the blocking walls are arranged around the light-emitting region.

12. The backlight module of claim 1, wherein a plurality of prism structures are arranged on each of the sides of the light-transmissive portion respectively adjacent to two adjacent light-emitting elements, and wherein the plurality of prism structures are arranged along each side of the light-transmissive portion and in a direction from the light board to the planar portion.

13. The backlight module of claim 1, wherein a thickness of the light-transmissive portion is less than a thickness of the light-shielding portion.

14. The backlight module of claim 1, wherein the light-transmissive portion is made of a transparent material.

15. The backlight module of claim 1, wherein the light board defines a receiving groove slot corresponding to a position of each retaining wall, and wherein a side of each retaining wall facing away from the planar portion is inserted into the respective receiving slot to be fixedly fitted with the respective receiving slot.

16. The backlight module of claim 15, wherein the receiving slots comprise at least two positioning slots, which are disposed at opposite corners of the light board.

17. A display device, comprising a display panel and further comprising a backlight module, wherein the backlight module is arranged on a side of a light incident surface of the display panel; wherein the backlight module comprises:

a light board;

a plurality of light-emitting elements, arranged at intervals on the light board; and a diffusion plate, arranged corresponding to a position of the light board and on a side of a light emitting surface of the light board; wherein the diffusion plate comprises a plurality of blocking walls and a planar portion, wherein the plurality of blocking walls are arranged at intervals on a side of the planar portion adjacent to the light board, and the planar portion is arranged parallel to the light board; wherein the plurality of blocking walls are disposed perpendicular to the planar portion, and wherein each of the blocking wall is arranged corresponding to a gap between two adjacent light-emitting elements;

wherein a height of the blocking wall is equal to a distance between the diffusion plate and the light board, and wherein a lower part of the blocking wall adjacent to the light board is opaque;

wherein each blocking wall comprises a light-shielding portion and a light-transmissive portion, wherein one side of the light-transmissive portion is connected to the planar portion, and another side is connected to one side of the light-shielding portion, and wherein another side of the light-shielding portion abuts against the light board; wherein a height of the light-transmissive portion is less than that of the light-shielding portion;

wherein the light-transmissive portion comprises a first light-transmissive portion and a second light-transmissive portion, which are spaced apart, and wherein the first light-transmissive portion and the second light-transmissive portion have a same thickness.

\* \* \* \* \*